(12) United States Patent
Levy et al.

(10) Patent No.: US 9,419,990 B2
(45) Date of Patent: Aug. 16, 2016

(54) APPARATUS AND METHOD FOR CHARACTERIZING THE RISK OF A USER CONTRACTING MALICIOUS SOFTWARE

(71) Applicant: Blue Coat Systems, Inc., Sunnyvale, CA (US)

(72) Inventors: Joseph H. Levy, Eagle Mountain, UT (US); Matthew S. Wood, Salt Lake City, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 0 days.

(21) Appl. No.: 13/754,810

(22) Filed: Jan. 30, 2013

(65) Prior Publication Data

US 2014/0215615 A1   Jul. 31, 2014

(51) Int. Cl.
*H04L 29/06* (2006.01)

(52) U.S. Cl.
CPC .................................. *H04L 63/1425* (2013.01)

(58) Field of Classification Search
CPC ...... H04L 63/1425; H04L 29/08; G06F 11/00
See application file for complete search history.

(56) References Cited

U.S. PATENT DOCUMENTS

| | | | |
|---|---|---|---|
| 8,015,133 B1 * | 9/2011 | Wu | H04L 63/1416 706/21 |
| 9,003,526 B2 * | 4/2015 | El-Moussa | 726/23 |
| 2010/0125911 A1 * | 5/2010 | Bhaskaran | G06Q 10/10 726/23 |
| 2010/0325731 A1 * | 12/2010 | Evrard | 726/25 |
| 2011/0302656 A1 * | 12/2011 | El-Moussa | H04L 63/1425 726/24 |
| 2013/0097709 A1 * | 4/2013 | Basavapatna | G06F 21/552 726/25 |

* cited by examiner

*Primary Examiner* — Jayesh Jhaveri
*Assistant Examiner* — Wasika Nipa
(74) *Attorney, Agent, or Firm* — Baker Botts L.L.P.

(57) ABSTRACT

A non-transitory computer readable storage medium includes executable instructions to identify specified network interactions initiated by a client machine. The specified network interactions are compared to normative values to produce a promiscuity score indicative of the risk of the client machine contracting malicious software. Depending upon the promiscuity score, prophylactic actions are optionally applied to the client machine.

11 Claims, 2 Drawing Sheets

APPARATUS AND METHOD FOR CHARACTERIZING THE RISK OF A USER CONTRACTING MALICIOUS SOFTWARE

FIELD OF THE INVENTION

This invention relates generally to communications in computer networks. More particularly, this invention relates to characterizing the risk of a user contracting malicious software.

BACKGROUND OF THE INVENTION

Malicious software, also referred to as malevolent software, malware or a computer contaminant, is software used to disrupt computer operation, gather sensitive information, or gain subversive or otherwise unwanted access to private computer systems. It can appear in the form of code, scripts or active content. Malware includes computer viruses, worms, Trojan horses, spyware and adware.

Malware is disruptive to an individual user that contracts the software. It may also be disruptive to a network of computers associated with an individual user, or to third parties that might be targeted by the illicit actions of computers compromised by malware.

Accordingly, it would be desirable to proactively identify individual users at risk of contracting malicious software.

SUMMARY OF THE INVENTION

A non-transitory computer readable storage medium includes executable instructions to identify specified network interactions initiated by a client machine. The specified network interactions are compared to normative values to produce a promiscuity score indicative of the risk of the client machine contracting malicious software. Depending upon the promiscuity score, prophylactic actions are optionally applied to the client machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
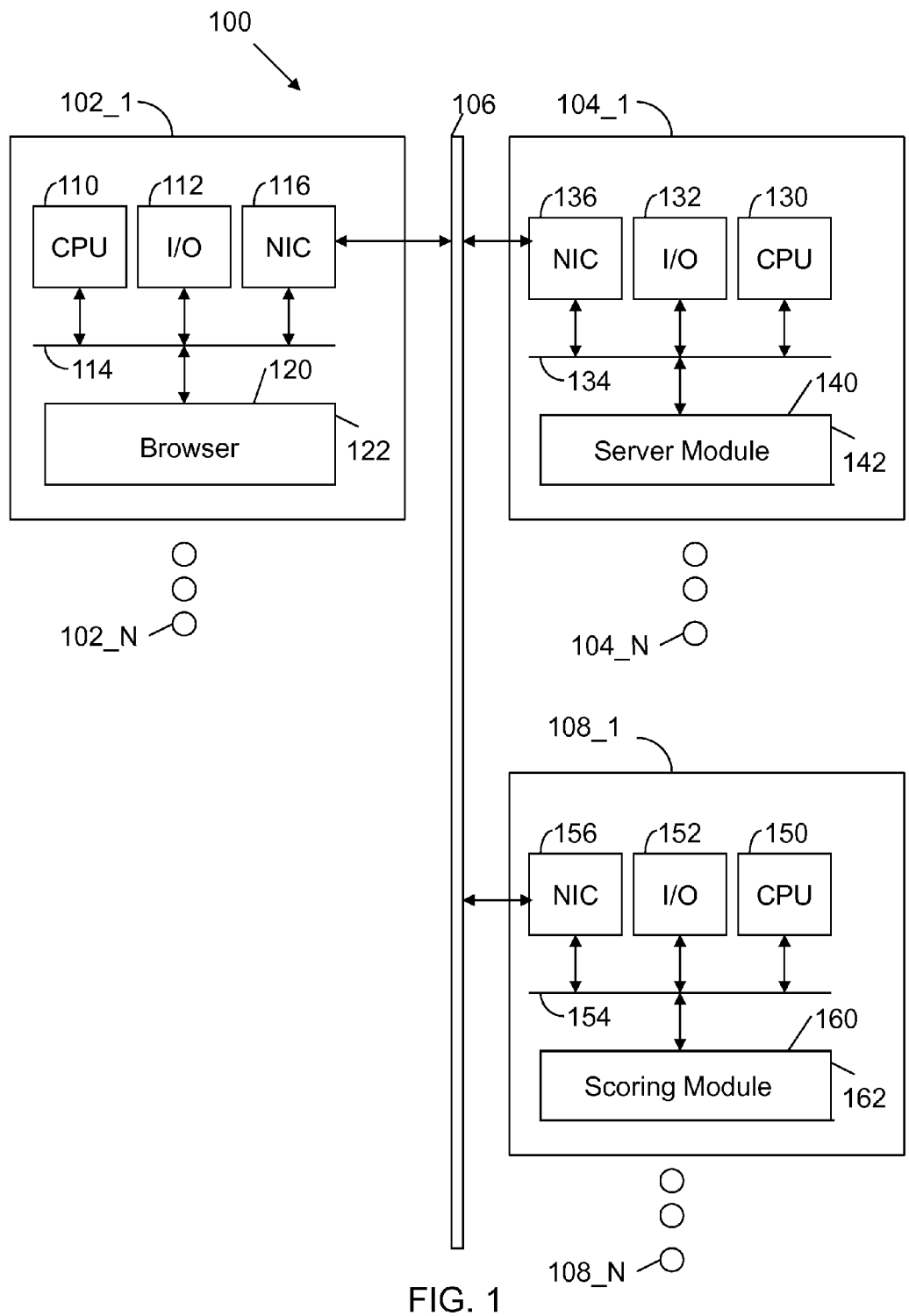
FIG. 1 illustrates a system configured in accordance with an embodiment of the invention.

FIG. 1 illustrates a system 100 configured in accordance with an embodiment of the invention. The system 100 includes client machines 102_1 through 102_N (any one of which may be generically referred to as client machine 102) communicating with servers 104_1 through 104_N (any one of which may be generically referred to as server 104) via a network 106, which may be any wired or wireless network. The network 106 may be an intranet, the public Internet, a local area network (LAN) client/server application, a file sharing application, a transactional network infrastructure protocol such as Domain Name System (DNS), Address Resolution Protocol (ARP) or Network Basic Input/Output System (NetBIOS).

Also included in the system are scoring machines 108_1 through 108_N (any one of which may be generically referred to as scoring machine 108). The scoring machines perform flow analyses from traffic collected from the network 106. Alternately, the traffic may be collected from an external emitter, such as through Simple Network Management Protocol (SNMP), Syslog, NetFlow, or Internet Protocol Flow Information Export (IPFIX). The traffic may also be collected from logs generated by external systems or from direct interrogation of endpoints through Application Program Interfaces (APIs).

Each client machine 102 includes standard components, such as a central processing unit 110 and input/output devices 112 connected via a bus 114. The input/output devices 112 may include a keyboard, touch display, mouse and the like. A network interface circuit 116 is also connected to the bus to provide connectivity to network 106. A memory 120 is also connected to the bus 114. The memory 120 stores executable instructions, such as a browser 122 to coordinate network communications. A client machine may be a personal computer, Tablet, Smartphone, personal digital assistant and the like.

Each server 104 also includes standard components, such as a central processing unit 130, input/output devices 132, a bus 134 and a network interface card 136. A memory 140 is also connected to the bus 134. The memory 140 stores a server module 142 to implement standard server operations. The nature of the client/server communication might be that of a web-browser to a web-server, a workgroup or domain client (e.g., Windows Active Directory, NTLM®, Samba®, Kerberos, etc.) to a domain controller or file server, a peer-to-peer session, a DNS client querying a DNS server, two Simple Mail Transfer Protocol (SMTP) endpoints exchanging email, a VoIP session, a videoconference, a social media session from a mobile device, etc.

Each scoring machine 108 includes standard components, such as a central processing unit 150, input/output devices 152, a bus 154 and a network interface card 156. A memory 160 is also connected to the bus 154. The memory 160 stores a scoring module 162 with executable instructions to implement operations of the invention.

Figure 2:
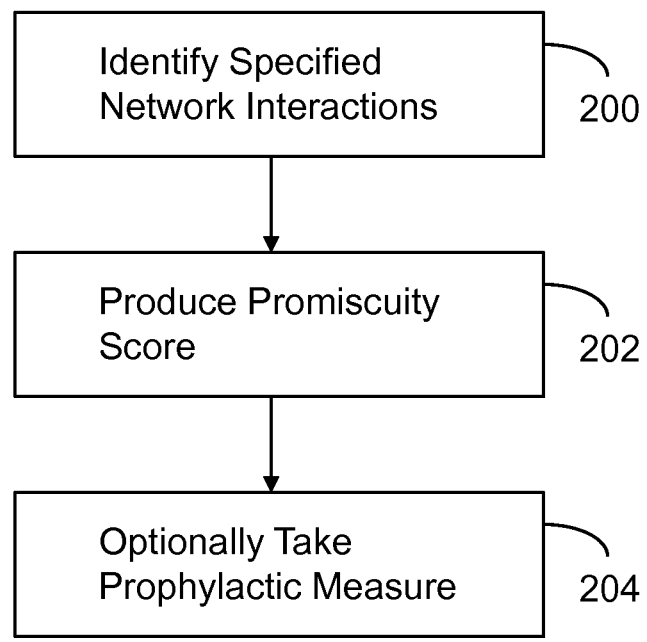
FIG. 2 illustrates processing operations associated with an embodiment of the invention.

FIG. 2 illustrates processing operations performed by a scoring module 142 associated with an embodiment of the invention. Specified network interactions are identified 200. For example, the scoring module 162 of server 104 may monitor interactions between a client device 102 and servers 104_1 through 104_N. Different types of specified network interactions are discussed below.

Next, the specified network interactions are compared to normative values to produce a promiscuity score 202. The promiscuity score is indicative of the risk of the client machine contracting malicious software. Depending upon the promiscuity score, prophylactic actions are optionally applied to the client. The prophylactic actions may include installing anti-virus software on the client machine, automatically remediating the infection through a cleaner module, isolating the client machine with a firewall or other enforcement or quarantining device, or delivering an alert to an administrator to follow up with such manual actions as desktop re-imaging or providing interventionist training to the user.

Any number of network interactions may be monitored. For example, the network interactions may be a host communication count. That is, a count may be calculated of the number of external host accesses made by a client machine. The count may be of the total number of unique endpoints the client communicates with, the total number of connections made to a specific endpoint or a combination of the two. This count may be used to establish a normative value for the client machine and/or an organization associated with the client machine. If a host communication count in a specified time period (e.g., a portion of a day, a day, a week or a month) is outside a normative value for the client machine and/or the organization associated with the client machine, a relatively high promiscuity score may be assigned to the client machine.

In one embodiment, a statistical distribution of host communication counts is maintained for the client machine and/or the organization associated with the client machine. Large deviations from a normative value in the form of a mean host communication count may indicate that a client machine has been hijacked by malware or an unauthorized user. The level of the statistical deviation for a current host communication count from a mean value of host communication counts may be used to ascribe a promiscuity score. A higher promiscuity score is ascribed for higher deviations from the mean value. The promiscuity score is updated in response to statistically significant circumstances, such as, circumstances far outside a standard deviation.

The promiscuity score may be updated for any specified time period. A small deviation during a typically inactive time period (e.g., from 2:00 am to 4:00 am) may be weighted to produce a large promiscuity score. On the other hand, a large deviation during a typically active time period (e.g., from 9:00 am to 5:00 pm) may be weighted to produce a damped promiscuity score. The comparison may be based upon an individual baseline and/or an organizational baseline. The promiscuity score may be based upon individual factors (weighted or non-weighted) and/or combinations of individual factors (weighted or non-weighted).

The specified network interactions may include accessed servers. More particularly, the nature of the accessed servers maybe evaluated. For example, the country associated with a server may provide an indication of potentially risky interactions. In this case, normative values may be low risk countries.

The length and structure of a Uniform Resource Locator (URL) may also be indicative of potentially risky interactions. In this example, a normative value is a URL with a length between a certain upper and lower threshold, and with a certain character distribution. A URL deviating from such a computed norm may be indicative of an untrustworthy server. Similarly, a URL with a number of nested slashes may indicate an obscure file that is untrustworthy. The web server platform may also be evaluated. For example, Nginx™ from NGINX, Inc., is an open source web server commonly utilized by malware developers. The content management system (CMS) platform may also be evaluated. For example, unpatched installation of the popular CMS platforms Joomla™ and Wordpress™ are common targets of exploitation wherein they are used to host malicious content. Thus, normative values in the form of safe web server platforms or content management systems may be specified. The foregoing factors may be evaluated and weighted in any number of ways to generate a promiscuity score.

The specified network interactions may include domain name system queries. Domain Name System (DNS) is a hierarchical distributed naming system for computers, services or any resource connected to the Internet or a private network. DNS associates information with domain names. A Domain Name Service resolves a query for a name into an Internet Protocol (IP) address. That is, such a service translates a human-friendly computer hostname into an IP address (a series of numbers). In one example of DNS analysis, the domain name being queried may be subjected to an n-gram analysis so as to compute a legitimacy score based on the sequence and combination of characters in the domain name. Statistically uncommon combinations or distributions of characters could be indicative of algorithmically generated domain names which are commonly employed in malware distribution systems. In another example, if a domain name system query resolves to a large number of IP addresses, or to a set of IP addresses (indicative of fast-flux behavior, a common robustness technique employed within malware distribution systems) this may be indicative of an unscrupulous computer operator. For example, a normative address resolution is to a single or small number of IP addresses that are relatively unchanging over time. A statistically significant deviation from this value may merit an adjusted promiscuity score.

A high promiscuity score may also be appropriate if the DNS query has a Time To Live (TTL) response rate that is small. TTL is a mechanism that limits the lifespan of data in a computer network. TTLs occur in the DNS where they are set for a particular resource record. When a caching name server queries the name server for a resource record, it will cache that record for the time (in seconds) specified by the TTL. A small TTL (e.g., 1-3 seconds) instead of a normative value (e.g., 3600 seconds) is commonly used by unscrupulous computer operators. Therefore, accessing a server with a small TTL may merit an increased promiscuity score.

The specified network interactions may include executable file transfers. That is, the nature of executable file transfers may be evaluated to identify potentially dangerous network activity. A drive-by download is an unintended download of computer software from the Internet. An unintended download may be authorized by a user, but without an understanding of the consequences (e.g., a download of an unknown or counterfeit executable program). The unintended download may occur without a person's knowledge, such as a computer virus, spyware or malware. Executable files may be compared to a white list of permissible executable files. If a transferred file does not appear on the white list, then a promiscuity score may be incremented. Certain patterns of file transfers may also justify an increased promiscuity score. For example, it is common in many malware infection scenarios to see a malicious executable downloaded and executed through the exploitation of vulnerability in a ubiquitous application, such as PDF™ viewer, an Office™ suite utility, or a Java™ Virtual Machine wherein the weaponized PDF, document, or Java archive is the proximate cause of the infection. That is, many known malware programs are installed after precursor events, the existence of which may be used to alter a promiscuity score.

The specified network interactions may include server message block connections. Server message block (SMB) operates as an application layer network protocol for shared access to files, printers, serial ports and miscellaneous communications between network nodes. SMB operates through a client-server approach where a client makes specific requests and the server responds accordingly. Excessive SMB connection requests may be indicative of a client machine looking to infect or otherwise compromise or exploit other hosts. Therefore, a statistical model may be maintained for an individual client machine and/or an organization associated with the client machine. Deviations in this statistical model may merit an increased promiscuity score.

The specified network interactions may include Hypertext Transfer Protocol (HTTP) posts. An HTTP post is a request and associated data that is received by a web server; if the web server accepts the request the associated data is stored at the web server. This technique is used when uploading a file or submitting a completed web form. Excessive HTTP posts and/or HTTP posts with large data sets may be indicative of nefarious actions by a client machine. Therefore, a statistical model may be maintained for an individual client machine and/or an organization associated the client machine. Deviations in the statistical model may merit an increased promiscuity score.

Secure Sockets Layer (SSL) and Transport Layer Security (TLS) are cryptographic protocols that provide communication security over the Internet. TLS and SSL encrypt segments of network connections at the application layer for the transport layer using asymmetric cryptography for key exchange, symmetric encryption for confidentiality and message authentication codes for message integrity. Although SSL and TLS are designed to provide confidentiality through encryption of the content, it is possible to evaluate SSL and TLS in a number of ways, and to incorporate such evaluations into promiscuity scoring. For example, it is possible to determine the common name (or the subject) of an SSL/TLS certificate, to produce catalogs of these common names, and to identify deviations from normal patterns of usage. It is also possible to perform n-gram analysis on the common names to detect randomly or algorithmically generated certificates, which are common to certain potentially unwanted network exchanges. Another example is to evaluate other aspects of the SSL/TLS exchange such as public key lengths, subject alternative names, certificate authorities, serial numbers, key usage, etc. Embodiments of the invention may entail SSL and TLS session evaluations.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor; and
a memory storing a scoring module with instructions executed by a processor to:
identify specified network interactions, wherein the specified network interactions include a client machine initiating connections to network endpoints; and
evaluate a statistical deviation of the specified network interactions relative to a normative value for the client machine to produce a promiscuity score indicative of a risk of the client machine contracting malicious software, wherein the specified network interactions include:
a host communication count during a specified time period and the normative value is a mean host communication count;
evaluations of accessed servers with respect to normative values for low risk server countries and Uniform Resource Locator character distribution;
evaluations of domain name system queries against normative values for combinations or distributions of characters in a domain name system query and the number of IP addresses a domain name system query resolves to;
evaluations of executable file transfers against a white list of permissible executable files;
evaluations of excessive server message block connections; and
evaluations of the number of Hypertext Transfer Protocol (HTTP) posts and the data set size of HTTP posts.

2. The server of claim 1 further comprising executable instructions stored in the memory and executable by the processor to apply a prophylactic action to the client machine.

3. The server of claim 2, wherein the prophylactic action is installing anti-virus software on the client machine.

4. The server of claim 2, wherein the prophylactic action is isolating the client machine with a firewall.

5. The server of claim 2, wherein the prophylactic action is automatically remediating an infection.

6. The server of claim 2, wherein the prophylactic action is delivering an alert to an administrator.

7. The server of claim 1, wherein the client machine is selected from the group consisting of a personal computer, a tablet, and smart phone, and a personal digital assistant.

8. The server of claim 1, wherein the host communication count is a total number of unique endpoints the client machine communicates with.

9. The server of claim 1, wherein the host communication count is a total number of connections made the client machine with a specific endpoint.

10. The server of claim 1, wherein the host communication count is a combination of a total number of unique endpoints the client machine communicates with and a total number of connections made by the client machine with a specific endpoint.

11. The server of claim 1, wherein the specified network interactions include evaluations of SSL and TLS sessions.

* * * * *